US010943359B2

(12) United States Patent
Ninan et al.

(10) Patent No.: US 10,943,359 B2
(45) Date of Patent: Mar. 9, 2021

(54) SINGLE DEPTH TRACKED ACCOMMODATION-VERGENCE SOLUTIONS

(71) Applicant: Dolby Laboratories Licensing Corporation, San Francisco, CA (US)

(72) Inventors: Ajit Ninan, San Jose, CA (US); Chun Chi Wan, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 208 days.

(21) Appl. No.: 16/323,236

(22) PCT Filed: Aug. 3, 2017

(86) PCT No.: PCT/US2017/045267
§ 371 (c)(1),
(2) Date: Feb. 4, 2019

(87) PCT Pub. No.: WO2018/027015
PCT Pub. Date: Feb. 8, 2018

(65) Prior Publication Data
US 2019/0172216 A1    Jun. 6, 2019

Related U.S. Application Data

(60) Provisional application No. 62/370,901, filed on Aug. 4, 2016.

(30) Foreign Application Priority Data

Aug. 4, 2016  (EP) .................................... 16182719

(51) Int. Cl.
*G06T 7/593*    (2017.01)
*H04N 13/383*   (2018.01)
(Continued)

(52) U.S. Cl.
CPC .............. *G06T 7/593* (2017.01); *G06T 5/002* (2013.01); *G06T 5/50* (2013.01); *H04N 13/128* (2018.05);
(Continued)

(58) Field of Classification Search
CPC .......... G06T 7/593; G06T 5/002; G06T 5/50; G06T 2207/10021; H04N 13/128; H04N 13/383; H04N 13/144; H04N 2013/0081
See application file for complete search history.

(56) References Cited

U.S. PATENT DOCUMENTS 6,111,597 A    8/2000  Tabata
7,428,001 B2   9/2008  Schowengerdt
(Continued)

FOREIGN PATENT DOCUMENTS

CN   102566049    7/2012
CN   104798370    7/2015
(Continued)

OTHER PUBLICATIONS

Hoffman, D.M., et al., "Stereo Display With Time-Multiplexed Focal Adjustment", Proc. SPIE 7237, Stereoscopic Displays and Applications XX,7237OR (Feb. 17, 2009).
(Continued)

*Primary Examiner* — Mark Roz

(57) ABSTRACT

While a viewer is viewing a first stereoscopic image comprising a first left image and a first right image, a left vergence angle of a left eye of a viewer and a right vergence angle of a right eye of the viewer are determined. A virtual object depth is determined based at least in part on (i) the left vergence angle of the left eye of the viewer and (ii) the right vergence angle of the right eye of the viewer. A second stereoscopic image comprising a second left image and a second right image for the viewer is rendered on one or more
(Continued)

US 10,943,359 B2

Page 2 image displays. The second stereoscopic image is subsequent to the first stereoscopic image. The second stereoscopic image is projected from the one or more image displays to a virtual object plane at the virtual object depth.

21 Claims, 12 Drawing Sheets

(51) Int. Cl.
    *H04N 13/144* (2018.01)
    *H04N 13/128* (2018.01)
    *G06T 5/00* (2006.01)
    *G06T 5/50* (2006.01)
    *H04N 13/00* (2018.01)

(52) U.S. Cl.
    CPC ......... *H04N 13/144* (2018.05); *H04N 13/383* (2018.05); *G06T 2207/10021* (2013.01); *H04N 2013/0081* (2013.01)

(56) References Cited

U.S. PATENT DOCUMENTS

| | | |
|---|---|---|
| 9,576,399 B2 * | 2/2017 | Lo .................. H04N 13/383 |
| 2004/0227699 A1 | 11/2004 | Mitchell |
| 2011/0228051 A1 | 9/2011 | Dedeoglu |
| 2013/0300828 A1 | 11/2013 | Yamato |
| 2015/0022887 A1 | 1/2015 | Larson |
| 2018/0081178 A1 | 3/2018 | Shpunt |

FOREIGN PATENT DOCUMENTS

| | | |
|---|---|---|
| EP | 2309310 | 4/2011 |
| JP | 2006287813 | 10/2006 |
| JP | 2012-237970 | 12/2012 |
| JP | 2012237970 | 12/2012 |
| JP | 2013090180 | 5/2013 |
| JP | 2013254358 | 12/2013 |
| JP | 2014071230 | 4/2014 |
| JP | 2014219621 | 11/2014 |
| KR | 20090014927 | 2/2009 |
| KR | 20150037230 | 4/2015 |
| WO | 2012/175939 | 12/2012 |
| WO | 2014/199127 | 12/2014 |
| WO | 2016/105521 | 6/2016 |

OTHER PUBLICATIONS

Love, G.D., "High-speed switchable lens enables the development of a volumetric stereoscopic display", Optics Express, vol. 17, No. 18, Aug. 31, 2009.

* cited by examiner

```
┌─────────────────────────────────────────┐
│ determine a left vergence angle of a    │
│ left eye of a viewer and a right        │
│ vergence angle of a right eye           │
│ of the viewer 402                       │
└─────────────────────────────────────────┘
                    │
                    ▼
┌─────────────────────────────────────────┐
│ determine, based on (i) the left        │
│ vergence angle and (ii) the right       │
│ vergence angle, a virtual object        │
│ depth 404                               │
└─────────────────────────────────────────┘
                    │
                    ▼
┌─────────────────────────────────────────┐
│ render a second stereoscopic image      │
│ comprising a second left image and a    │
│ second right image for the viewer on    │
│ image display(s) 406                    │
└─────────────────────────────────────────┘
                    │
                    ▼
┌─────────────────────────────────────────┐
│ project the second stereoscopic image   │
│ from the image display(s) to a virtual  │
│ object plane at the virtual object      │
│ depth 408                               │
└─────────────────────────────────────────┘
```

FIG. 4

SINGLE DEPTH TRACKED ACCOMMODATION-VERGENCE SOLUTIONS

TECHNOLOGY

The present invention relates generally to image rendering, and in particular, to applying single depth tracked accommodation-vergence solutions to three dimensional (3D) and/or multi-view image rendering with display devices.

BACKGROUND

Retina refers to a substantial part of an interior surface of an eye (e.g., of a human, of a viewer, etc.) with visual sensors opposite to the pupil of the eye. Fovea refers to a relatively tiny middle portion of the retina that hosts numerous visual sensors capable of the sharpest vision and the most sensitive color reception in the eye.

The human brain uses a vergence process to control extraocular muscles to simultaneously converge or diverge two eyes of the (human) viewer toward any visible object in a scene in order to support the perception of the object as a 3D object. At the same time, the human brain uses an accommodation process to control ciliary muscles to adapt each of eye lenses located behind pupils in the two eyes to certain focal lengths (or powers) in order to support the clear vision or foveal vision of the object.

When viewing real world objects in a real world environment (or scene), the human brain uses natural interdependent accommodation and vergence processes to simultaneously control the ciliary muscles and the extraocular muscles to adapt both focal lengths of the viewer's separate eye lenses in order to support the clear vision (or the foveal vision) of a real world object located at a certain spatial position and concurrently to converge and diverge both of the eyes toward the real world object at the certain spatial position in order to support the perception of the real world environment that includes the real world object.

In contrast, when viewing 3D images with near-eye displays, the human brain has to go through a relearning process to use conflicting accommodation and vergence processes to control the ciliary muscles and the extraocular muscles. These conflicting accommodation and vergence processes control the ciliary muscles and the extraocular muscles in viewing 3D images very differently from how the accommodation and vergence processes control the ciliary muscles and the extraocular muscles in viewing real world objects in a real world environment.

More specifically, the human brain needs to control the ciliary muscles to set the eye lenses of the viewer's eyes to a constant focal length in order to support the clear vision (or foveal vision) of images rendered on the near-eye displays located at a fixed distance from the eyes, regardless of where a depicted object in the images that is being viewed by the viewer is supposed to be located. At the same time when the ciliary muscles fix the focal lengths of the eye lenses to view clearly at the near-eye displays, the human brain still needs to control the extraocular muscles to converge or diverge the eyes simultaneously toward the depicted object in the images at a distance away from the near-eye displays in order to support the perception of the object as a 3D object.

This is known as the accommodation-vergence conflict. That is, the brain has to control the ciliary and extraocular muscles very differently in viewing 3D images than in viewing real world objects. Unfortunately, the accommodation-vergence conflict in 3D image viewing can cause frequent and serious physiological discomforts/sickness such as nauseas, headaches, disorientation, etc., during and after viewing 3D images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4 illustrates an example process flow; and

DESCRIPTION OF EXAMPLE EMBODIMENTS

Figure 1A:
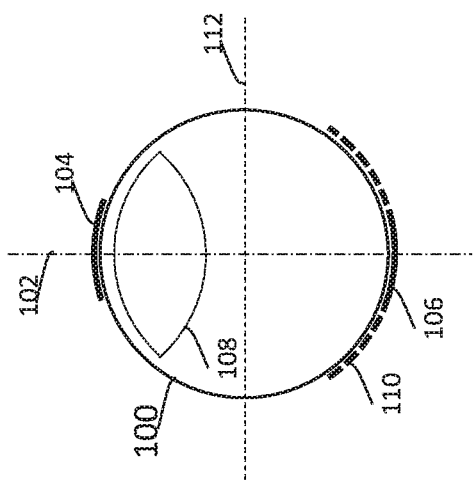
FIG. 1A illustrates a cross-sectional view of an example human eye.

Example embodiments, which relate to applying single depth tracked accommodation-vergence solutions to 3D and/or multi-view image rendering with display devices, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. ACCOMMODATION AND VERGENCE
3. CONFLICT BETWEEN ACCOMMODATION AND VERGENCE
4. SOLVING CONFLICT BETWEEN ACCOMMODATION AND VERGENCE
5. TRACKING VERGENCE ANGLES
6. EXAMPLE VIDEO STREAMING SERVERS AND CLIENTS
7. EXAMPLE PROCESS FLOWS

8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Example embodiments described herein relate to solving accommodation-vergence conflicts in rendering and viewing 3D images (or multi-view images) through auto-tunable lenses. While a viewer is viewing a first stereoscopic image comprising a first left image and a first right image, a left vergence angle of a left eye of a viewer and a right vergence angle of a right eye of the viewer are determined. A virtual object depth is determined based at least in part on (i) the left vergence angle of the left eye of the viewer and (ii) the right vergence angle of the right eye of the viewer. A second stereoscopic image comprising a second left image and a second right image for the viewer is rendered on one or more image displays. The second stereoscopic image is subsequent to the first stereoscopic image. The second stereoscopic image is projected from the one or more image displays to a virtual object plane at the virtual object depth.

In some embodiments, the second left image and the second right image are generated from an input left image and an input right image by applying one or more aspect ratio adjustment operations that adjust aspect ratios of visual objects depicted in the input left image and the input right image to modified aspect ratios of the visual objects depicted in the second left image and the second right image as projected to the virtual object plane at the virtual object depth.

In some embodiments, the second left image and the second right image are generated from an input left image and an input right image by applying one or more depth correction operations that converts depths of visual objects depicted in the input left image and the input right image to modified depths of the visual objects depicted in the second left image and the second right image as projected to the virtual object plane at the virtual object depth.

In some embodiments, the second left image and the second right image are generated from an input left image and an input right image by applying one or more blurring filtering operations that blur the one or more spatial regions of the second left image and the second right image relative to the input left image and the input right image, and wherein the one or more spatial regions of the second left image and the second right image are away from the viewer's foveal vision.

In some example embodiments, mechanisms as described herein form a part of a media processing system, including but not limited to any of: near-eye displays, cloud-based server, mobile device, virtual reality system, augmented reality system, head up display device, helmet mounted display device, zSpace displays, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Accommodation and Vergence

FIG. 1A illustrates a cross-sectional view of an example human eye 100 of a viewer, as viewed from directly above the viewer's head. As illustrated, the eye (100) has an optical axis 102 (vertical to a lateral line 112) that passes through the center point of a pupil 104 located in the front portion of the eye (100) and the center point of a fovea 106 located in a retina 110 in the back portion of the eye (100). Light collected through an eye lens 108 located behind the pupil (104) may be projected by the eye lens (108) onto the fovea (106). For the purpose of illustration only, the eye lens (108) may be optically characterized with an eye focal length. As the eye lens may or may not represent an optical lens of a single focal length, the eye focal length as described herein may refer to one of: a focal length for light near the optical axis (102), an average focal length of a central portion of the eye lens, an effective focal length for light near the optical axis (102), a focal length in reference to light projected onto the fovea, a focal length of a locally near perfect lens relative to the foveal vision, etc. It should be noted that in various embodiments, the eye lens may be modeled as a single lens or multiple lenses, one, some or all of which may have variable focal lenses controllable for example through ciliary muscles in or associated with the eye (100).

Figure 1B:
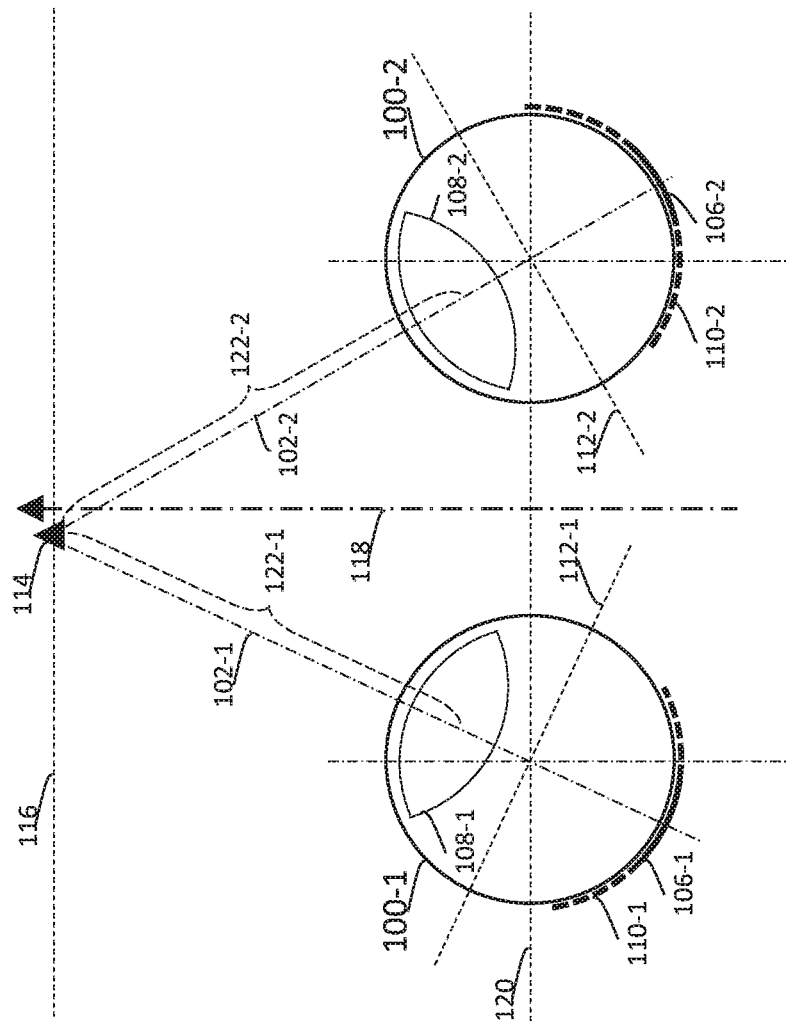
FIG. 1B illustrates example viewing of a real world object located in an object plane by left eye and right eye.

FIG. 1B illustrates example viewing of a real world object 114 located in an object plane 116 by a viewer's left eye 100-1 and right eye 100-2. As illustrated, the object plane (116)—in which the real world object (114) is located—is perpendicular to the viewer's frontal viewing direction 118, and is parallel to the viewer's inter-pupillary line 120.

To effectuate a clear vision of the real world object (114) through both of the left fovea (106-1) of the left eye (100-1) and the right fovea (106-2) of the right eye (100-2), the viewer's brain uses a vergence process (e.g., a divergence process, a convergence process, etc.) to control extraocular muscles in both eyes simultaneously to orient the left eye (100-1) and the right eye (100-2) toward the real world object (114). If the viewer's optical axes (102-1 and 102-2, vertical to lateral lines 112-1 and 112-2 respectively) were previously directed at a spatial point closer than the real world object (114), the viewer's brain uses a divergence process to control the extraocular muscles in both eyes to diverge simultaneously the left eye (100-1) and the right eye (100-2) toward the real world object (114). Otherwise, if the viewer's optical axes (102-1 and 102-2) were previously directed at a spatial point farther than the real world object (114), the viewer's brain uses a convergence process to control the extraocular muscles in both eyes to converge simultaneously the left eye (100-1) and the right eye (100-2) toward the real world object (114).

As a result, the left optical axis (102-1) of the left eye (100-1) and the right optical axis (102-2) of the right eye (100-2) (e.g., with normal vision) coincide at the real world object (114) to cause light from the real world object (114) to be projected onto both of the left fovea (106-1) of the left eye (100-1) and the right fovea (106-2) of the right eye (100-2).

In viewing real world objects in a real world environment/scene, accommodation and vergence processes/functions are not independent but rather inter-dependent in the viewer's brain to control muscles to verge (converge/diverge) toward an object and concurrently (e.g., adapt to) focus on the same object. For example, at the same time while the vergence process is used to control the extraocular muscles in both eyes simultaneously to orient the left eye (100-1) and the right eye (100-2) toward the real world object (114), the viewer's brain uses an accommodation process to control ciliary muscles in both eyes simultaneously to focus the left eye (100-1) and the right eye (100-2) onto the real world object (114). The focal lengths of the left eye (100-1) and the right eye (100-2) may be adjusted by the accommodation process such that light (e.g., emitted, reflected, etc.) from the real world object (114) is focused at image planes (or retinas) coinciding the left fovea (106-1) and the right fovea (106-2). More specifically, the focal length of the left eye (100-1) may be set by the accommodation process based at least in part on a (left) distance 122-1 between the real world object (114) and the left eye lens (108-1) to cause the light from the real world object (114) to be focused at a left image plane (or left retina) coinciding the left fovea (106-1), whereas the focal length of the right eye (100-2) may be set by the accommodation process based at least in part on a (right) distance 122-2 between the real world object (114) and the right eye lens (108-2) to cause the light from the real world object (114) to be focused at a right image plane (or right retina) coinciding the right fovea (106-2). In scenarios in which the real world object (114) is located from the viewer's eyes at a distance much (e.g., ten times, etc.) greater than the viewer's inter-pupillary distance (the distance between the viewer's two eyes) along the inter-pupillary line (120), the focal lengths of the left eye (100-1) and the right eye (100-2) may be adjusted by the accommodation process to the same focal length or approximately same focal lengths.

3. Conflict Between Accommodation and Vergence

In some embodiments, stereoscopic images or multi-view images as described herein can be captured with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: 3D cameras, multi-view cameras, light field cameras, multiple cameras with overlapping and/or non-overlapping fields of vision, digital cameras, analog cameras, webcams, etc.

A left image, a right image, an image of a specific view in a plurality of different views, etc., of a stereoscopic image or a multi-view image as described herein may be recorded or assembled as pixel values distributed pixels of an image frame.

Figure 2A:
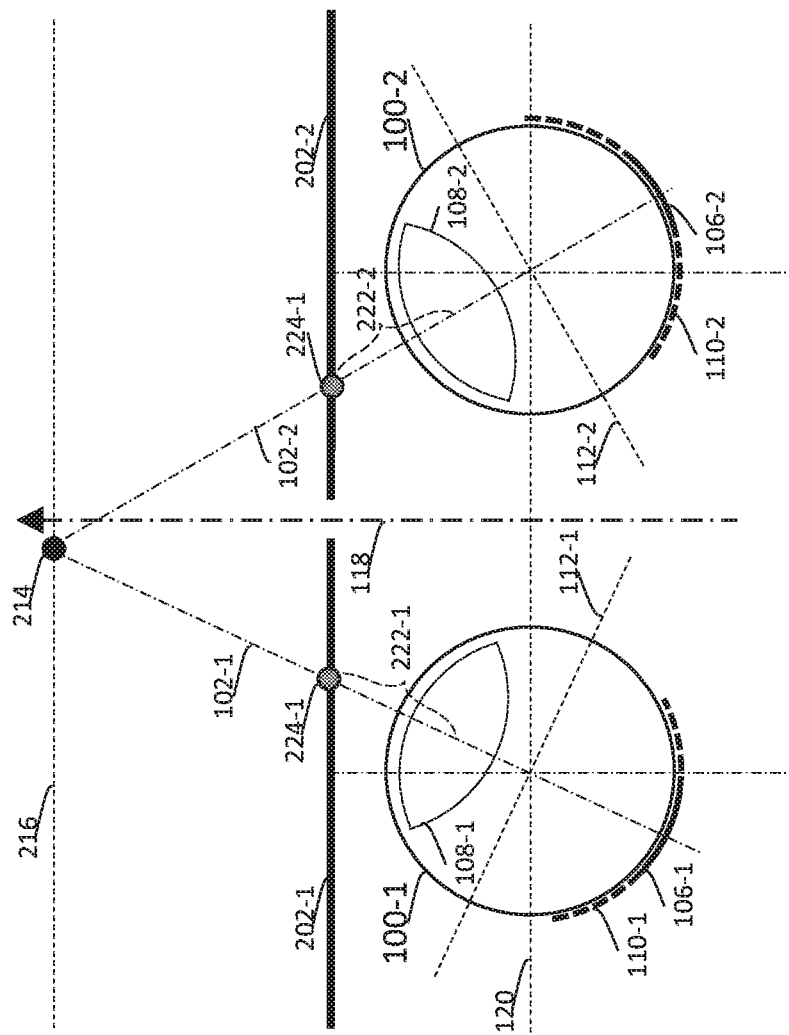
FIG. 2A, FIG. 2B and FIG. 2D illustrate example viewing of virtual object(s) depicted in a stereoscopic image comprising a left image and a right image.

FIG. 2A illustrates example viewing of a virtual object 214 depicted in a stereoscopic image comprising a left image 202-1 and a right image 202-2. The virtual object (214) may be represented in the stereoscopic image as located in a virtual object plane 216 by the viewer's left eye (100-1) and right eye (100-2). For the purpose of illustration only, the virtual object plane (216)—in which the virtual object (214) is (virtually) located—is perpendicular to the viewer's frontal viewing direction (118), and is parallel to the viewer's inter-pupillary line (120).

To effectuate a clear vision of the virtual object (214) through both of the left fovea (106-1) of the left eye (100-1) and the right fovea (106-2) of the right eye (100-2), the viewer's brain uses a vergence process (e.g., a divergence process, a convergence process, etc.) to control extraocular muscles in both eyes simultaneously to orient the left eye (100-1) and the right eye (100-2) toward the virtual object (214). If the viewer's optical axes (102-1 and 102-2) were previously directed at a virtual spatial point (depicted in the stereoscopic image) closer than the virtual object (214), the viewer's brain uses a divergence process to control the extraocular muscles in both eyes to diverge simultaneously the left eye (100-1) and the right eye (100-2) toward the virtual object (214). Otherwise, if the viewer's optical axes (102-1 and 102-2) were previously directed at a virtual spatial point (depicted in the stereoscopic image) farther than the virtual object (214), the viewer's brain uses a convergence process to control the extraocular muscles in both eyes to converge simultaneously the left eye (100-1) and the right eye (100-2) toward the virtual object (214).

As a result, the left optical axis (102-1) of the left eye (100-1) and the right optical axis (102-2) of the right eye (100-2) coincide at the virtual object (214) to cause light from left pixels 224-1 (in the left image (202-1)) and right pixels 224-2 (in the right image (202-2)) depicting the virtual object (214) to be respectively projected onto the left fovea (106-1) of the left eye (100-1) and the right fovea (106-2) of the right eye (100-2).

At the same time while the vergence process is used to control the extraocular muscles in both eyes simultaneously to orient the left eye (100-1) and the right eye (100-2) toward the virtual object (214), the viewer's brain uses an accommodation process to control ciliary muscles in both eyes simultaneously to focus the left eye (100-1) and the right eye (100-2) respectively onto the left pixels (224-1) and the right pixels (224-2) depicting the virtual object (214). The focal lengths of the left eye (100-1) and the right eye (100-2) may be adjusted by the accommodation process such that light from the left pixels (224-1) and the right pixels (224-2) depicting the virtual object (214) is focused at respective image planes (or retinas) coinciding the left fovea (106-1) and the right fovea (106-2). More specifically, the focal length of the left eye (100-1) may be set by the accommodation process based at least in part on a (left) distance 222-1 between the left pixels (224-1) and the left eye lens (108-1) to cause the light from the left pixels (224-1) to be focused at the left image plane (or left retina) coinciding the left fovea (106-1), whereas the focal length of the right eye (100-2) may be set by the accommodation process based at least in part on a (right) distance 222-2 between the right pixels (224-2) and the right eye lens (108-2) to cause the light from the right pixels (224-2) to be focused at the right image plane (or right retina) coinciding the right fovea (106-2). In scenarios in which the left and right images (202-1 and 202-2) are located from the viewer's eyes at a distance comparable to that of the viewer's inter-pupillary distance (the distance between the viewer's two eyes) along the inter-pupillary line (120), the focal lengths of the left eye (100-1) and the right eye (100-2) may be adjusted by the accommodation process to respectively different focal lengths.

The accommodation and vergence processes/functions used by the viewer's brain in FIG. 2A operate quite different from the accommodation and vergence processes/functions used by the viewer's brain in FIG. 1B.

For example, as previously noted, in viewing a real world object such as illustrated in FIG. 1B, the viewer's brain uses natural accommodation and vergence processes to control muscles to verge (converge/diverge) toward an object and concurrently (e.g., adapt to) focus on the same object. More specifically, the accommodation process in FIG. 1B adjusts the focal lengths of the left eye lens (108-1) and the right eye lens (108-2) based on the distances between the real world object (114) and the left and right eye lens (108-1 and 108-2). These distances self-consistently coincide or terminate/end with the intersection of the optical axes (102-1 and 102-2) of the left eye (100-1) and the right eye (100-2). In addition, in most cases, as these distances are many multiples of the inter-pupillary distance, the focal lengths of the left eye lens (108-1) and the right eye lens (108-2) as set by the accommodation process in FIG. 1B are substantially the same.

On the other hand, in viewing a virtual object such as illustrated in FIG. 2A, the viewer's brain has to use new and unnatural accommodation and vergence processes to control muscles to verge (converge/diverge) toward the virtual object and concurrently and conflictingly focus on the pixels (on display(s)) depicting the virtual object rather than the virtual object at a virtual spatial position. More specifically, the accommodation process in FIG. 2A adjusts the focal lengths of the left eye lens (108-1) and the right eye lens (108-2) based on the distances between the left pixels (224-1) and the left eye lens (108-1) and between the right pixels (224-2) and the right eye lens (108-2) to fix the sharpest vision at the display(s) on which the left and right pixels (224-1 and 224-2) are rendered. These distances do not coincide and do not terminate/end with the intersection of the optical axes (102-1 and 102-2) of the left eye (100-1) and the right eye (100-2). The left eye lens (108-1) and the right eye lens (108-2), along with the left fovea (106-1) and the right fovea (106), essentially are forced to be directed to two different groups of pixels respectively located at two different displays (or located at different spatial locations of the same display).

In addition, in cases in which the left and right images (202-1 and 202-2) are rendered close to the viewer's eyes (100-1 and 100-2), as the distances between the left pixels (224-1) and the left eye lens (108-1) and between the right pixels (224-2) and the right eye lens (108-2) are comparable to the inter-pupillary distance, the focal lengths of the left eye lens (108-1) and the right eye lens (108-2) as set by the accommodation process in FIG. 2A can be sufficiently different to force the viewer's brain to relearn additional new controls of the eyes to use different focal lenses of the eye lenses as a part of overcoming the accommodation-vergence conflict.

4. Solving Conflict Between Accommodation and Vergence

Figure 2B:
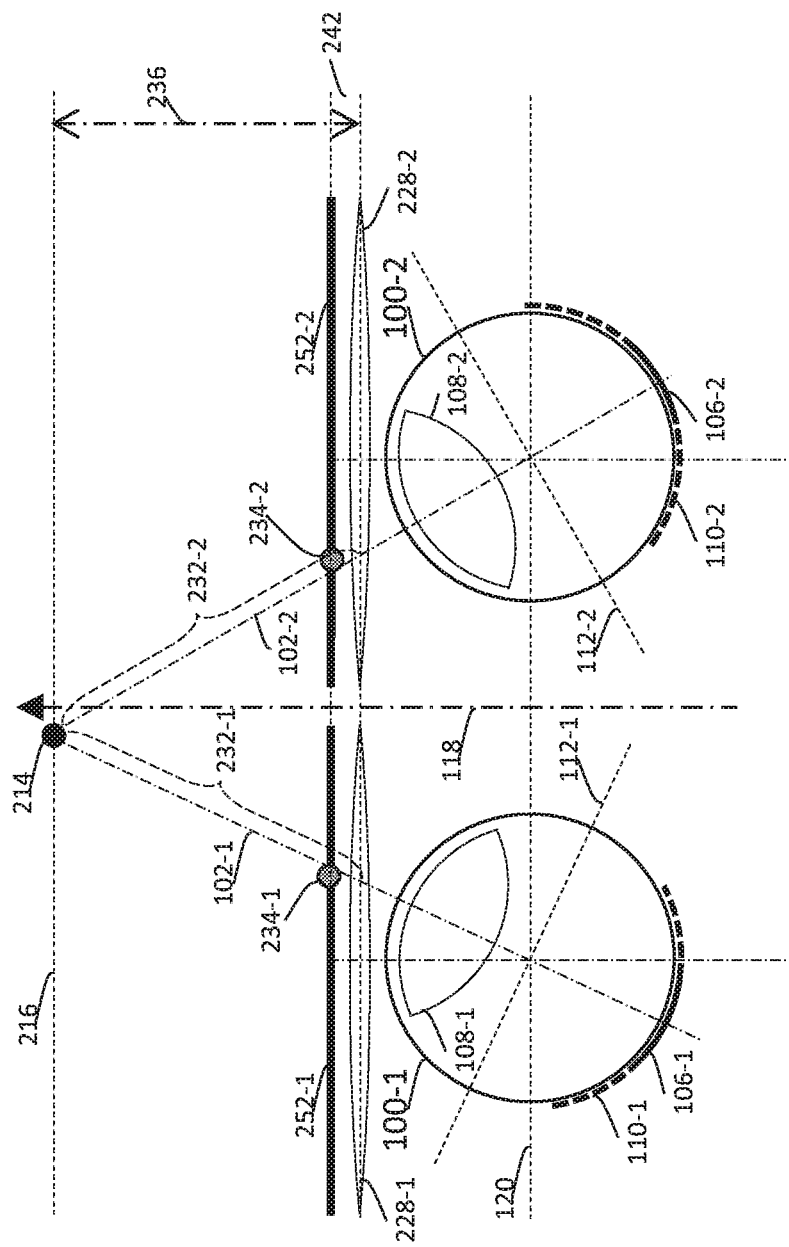

FIG. 2B illustrates example viewing of the virtual object (214) depicted in the stereoscopic image comprising the left image (252-1) and the right image (252-2) through one or more auto-tunable lenses 228-1, 228-2, etc., disposed in between (a) one or more image displays on which the left image (252-1) and the right image (252-2) are rendered and (b) the viewer's eyes (100-1 and 100-2). In some embodiments, some or all of the image displays are stationary (e.g., at a fixed distance to the viewer, etc.) with respect to the viewer and are parallel (or substantially parallel) to the inter-pupillary line (120). For the purpose of illustration only, the auto-tunable lenses comprise a left auto-tunable lens 228-1 disposed in between the left image (252-1) and the left eye (100-1) and a right auto-tunable lens 228-2 disposed in between the right image (252-2) and the right eye (100-2). Example auto-tunable lenses as described herein may include, but are not necessarily limited to only, any of: mechanically controllable auto-tunable lenses, electronically controllable auto-tunable lenses, liquid-based auto-tunable lenses, etc.

An image processing system as described herein may be used in any of a variety of display applications including but not limited to: 3D display applications, multi-view display applications, spherical image display applications, virtual reality (VR) applications, augmented reality (AR) applications, remote presence applications, etc. The image processing system can be configured to perform gaze tracking operations (and/or eye tracking operations) in real time to determine which specific virtual spatial location is being looked at by the viewer's eyes at any given time in a display application that renders 3D or multi-view images to be viewed by the viewer. For the purpose of illustration, based on results of the gaze/eye tracking operations, the image processing system determines/deduces the specific virtual spatial location at which the virtual object (214) is located. The gaze/eye tracking operations can be based on any combination of one or more (e.g., real-time) gaze/eye tracking methods. For example, these gaze/eye tracking methods may operate with one or more of: eye attachments, optical sensors, eye image acquisition and analyses, electric field measurements, infrared light, etc.

In various embodiments, the specific virtual spatial location may be represented in any spatial coordinate system (e.g., a Cartesian coordinate system, a polar coordinate system, the World coordinate system, a relative coordinate system, etc.) represented in an image rendering environment in which the viewer is located.

Based on the specific virtual spatial location at the given time, the image processing system identifies/determines the virtual object plane 216 at which the specific virtual spatial location (or the virtual object (214)) is located at the given time. For example, based on the specific virtual spatial location at the given time, the image processing system may compute a single depth 236 (or virtual object depth) for the virtual object plane (216) at the given time. The single depth (236) may, but is not necessarily limited to, be represented by a distance between the virtual object plane (216) and the auto-tunable lenses (228-1 and 228-2). Both of the left image (252-1) and the right image (252-2) rendered at the image rendering planes may be projected respectively by the left auto-tunable lens (228-1) and the right auto-tunable lens (228-2) to the virtual object plane (216).

In some embodiments, the image processing system uses lens equation(s) to determine focal length(s) of the left and right auto-tunable lenses (228-1 and 228-2).

In a non-limiting implementation example, a single focal length may be computed using a lens equation; both the left and right auto-tunable lenses (228-1 and 228-2) may be automatically tuned to the same computed single focal length. The input to the lens equation in computing this single focal length may comprise (a) the single depth (236) represented by the distance between the virtual object plane (216) and the auto-tunable lenses (228-1 and 228-2) and (b) an image display depth (242) represented by a distance between the auto-tunable lenses (228-1 and 228-2) and the image displays on which the left image (252-1) and the right image (252-2) are rendered. The single depth (236) may be used as the image distance (d2) in the lens equation, whereas the image display depth (242) may be used as the object distance (d1) in the lens equation. An example of the lens equation to compute a focal length of an auto-tunable lens as described herein is provided as follows:

$$\frac{1}{d1} + \frac{1}{d2} = \frac{1}{f} \quad (1)$$

The presence of the auto-tunable lenses (228-1 and 228-2) effectively moves images from the image displays at which the left image (252-1) and the right image (252-2) are actually rendered to a virtual image display (represented by the virtual object plane (216)) onto which the left image (252-1) and the right image (252-2) are projected by the auto-tunable lenses (228-1 and 228-2).

To effectuate a clear vision of the virtual object (214) through both of the left fovea (106-1) of the left eye (100-1) and the right fovea (106-2) of the right eye (100-2), the viewer's brain uses a vergence process (e.g., a divergence process, a convergence process, etc.) to control extraocular muscles in both eyes simultaneously to orient the left eye (100-1) and the right eye (100-2) toward the virtual object (214).

As a result, the left optical axis (102-1) of the left eye (100-1) and the right optical axis (102-2) of the right eye (100-2) coincide at the virtual object (214) to cause light from the virtual object (214) to be projected onto the left fovea (106-1) of the left eye (100-1) and the right fovea (106-2) of the right eye (100-2). More specifically, the light from the virtual object (214) comprises (a) a left light portion as projected by the left auto-tunable lens (228-1) from left pixels 234-1 (in the left image (252-1)) and (b) a right light portion as projected by the right auto-tunable lens (228-2) from right pixels 234-2 (in the right image (252-2)), where the left pixels (234-1) and the right pixels (234-2) depicts the virtual object (214). The left light portion corresponding to virtual image portions of the left pixels (234-1) is received by the left fovea (106-1) of the left eye (100-1), whereas the right light portion corresponding to virtual image portions of the right pixels (234-2) is received by the right fovea (106-2) of the right eye (100-2).

At the same time while the vergence process is used to control the extraocular muscles in both eyes simultaneously to orient the left eye (100-1) and the right eye (100-2) toward the virtual object (214), the viewer's brain uses an accommodation process to control ciliary muscles in both eyes simultaneously to focus the left eye (100-1) and the right eye (100-2) respectively onto the virtual object (214) at the virtual object plane (216). The focal lengths of the left eye (100-1) and the right eye (100-2) may be adjusted by the accommodation process such that light from the virtual object (214) is focused at respective image planes coinciding the left fovea (106-1) and the right fovea (106-2). More specifically, the focal length of the left eye (100-1) may be set by the accommodation process based at least in part on a (left) distance between the virtual spatial location at which the virtual object (214) is located and the left eye lens (108-1) to cause the left light portion of the light from the virtual object (214) to be focused at the left image plane coinciding the left fovea (106-1), whereas the focal length of the right eye (100-2) may be set by the accommodation process based at least in part on a (right) distance between the virtual spatial location at which the virtual object (214) is located and the right eye lens (108-2) to cause the right light portion of the light from the light from the virtual object (214) to be focused at the right image plane coinciding the right fovea (106-2). In scenarios in which the virtual spatial location at which the virtual object (214) is located is from the viewer's eyes at a distance much greater than that of the viewer's inter-pupillary distance (the distance between the viewer's two eyes) along the inter-pupillary line (120), the focal lengths of the left eye (100-1) and the right eye (100-2) may be the same or approximately the same.

The accommodation process used by the viewer's brain in FIG. 2B is identical or substantially the same as the accommodation process used by the viewer's brain in FIG. 1B. For example, as in FIG. 1B, the accommodation process in FIG. 2B adjusts the focal lengths of the left eye lens (108-1) and the right eye lens (108-2) based on the distances between the virtual object (214) that is in the viewer's foveal vision and the left and right eye lens (108-1 and 108-2). As in FIG. 1B, these distances in FIG. 2B self-consistently coincide or terminate/end with the intersection of the optical axes (102-1 and 102-2) of the left eye (100-1) and the right eye (100-2). In addition, as in FIG. 1B, in most cases, as these distances are many multiples of the inter-pupillary distance, the focal lengths of the left eye lens (108-1) and the right eye lens (108-2) as set by the accommodation process in FIG. 1B are substantially the same.

Under some approaches, for a single stereoscopic image, multiple rendered images (e.g., 6 rendered images at six different depths, 12 rendered images at 12 different depths, rendered images at continuously variable depths, etc.) may be generated and displayed at multiple depths. Objects depicted in the stereoscopic image may be displayed in one of the multiple rendered images based on depths of the depicted objects in relation to the depths of the multiple rendered images. This leads to a display system in which numerous rendered images are generated and displayed and in which some of the depicted objects in between the multiple depths are represented inaccurately and/or need intensive computations to interpolate the depicted objects that have depths mismatching the multiple depths of the multiple rendered images. For a given frame refresh rate (e.g., 60 frames per second, 120 frames per second, etc.) of a display system, displaying multiple rendered images at multiple different depths for a single stereoscopic image is prone to generating perceptible image judders.

In contrast, techniques as described herein can be used to determine a single depth at which a single stereoscopic or multi-view image should be displayed based on where a viewer is currently looking. This allows a display system that implement the techniques as described herein to present/project a left image and a right image to a single depth or to a very low number of depths, for example, through the use of one or more auto-tunable lenses. The techniques effectively solve the accommodation-vergence conflict as accommodation and vergence processes can adapt the viewer's eyes toward the same spatial location at which image details of the stereoscopic image that, for example, depict an object/person. In addition, the techniques as described herein can be deployed in a wide variety of display systems including but not necessarily limited to only any of: near-eye displays, head-mounted displays, zSpace displays, cinema displays, large display systems, medical display systems, high frame rate display systems, relatively low frame rate display systems, 3D glasses, TVs, etc.

In some embodiments, an auto-tunable lens (e.g., 228-1, 228-2, etc.) comprises a single lens element; a focal length of the single lens element can be adjusted based on where an image (e.g., 252-1, 252-2) is to be projected to by the auto-tunable lens.

In some embodiments, an auto-tunable lens (e.g., 228-1, 228-2, etc.) comprises multiple lens elements; some or all of focal lengths of the multiple lens elements can be adjusted based on where an image (e.g., 252-1, 252-2) is to be projected to by the auto-tunable lens. For example, one or more lens elements of the auto-tunable lens can be determined/selected by an image processing system as described herein to project a portion of the image to a virtual object plane (216), where the portion of the image includes a specific virtual spatial location (on the virtual object plane (216)) that is within the viewer's foveal vision (e.g., 106-1, 106-2, etc.). A distance (e.g., 232-1, 232-2, etc.) between the specific virtual spatial location and the lens elements can be determined based on geometric relationships (e.g., single depth (236), etc.) between the virtual object plane (216) and a plane (e.g., locations of the lens elements, the location of the auto-tunable lens, etc.) at which the auto-tunable lens is located. Based at least in part on the distance between the specific virtual spatial location and the lens elements, the focal lengths of the lens elements can be determined in one or more lens equations.

In some embodiments, a single auto-tunable lens is used to project both a left image and a right image on one or more image displays to a virtual object plane at a single depth at any given time point.

Different viewers may have different vision characteristics including near-sightedness, far-sightedness, normal stereoscopic vision, abnormal stereoscopic vision, wearing glasses, wearing no glasses, wearing contact lenses, etc. Additionally, optionally, or alternatively, different viewers may have different head geometric characteristics including inter-pupillary distances, eye-to-auto-tunable-lens distances, etc. In some embodiments, an image processing system may be capable of being specifically calibrated for a specific viewer with specific vision characteristics and/or specific head geometric characteristics. For example, before the image processing system is used for viewing 3D or multi-view images of a display application, in a calibration session, a test stereoscopic image may be presented by the image processing system to the viewer at different depths distributed around a single depth corresponding to a reference viewer with a perfect/reference vision. A corrected depth specific to the viewer may be determined automatically with or without user input. This process may be repeated for the viewer over each of a plurality of depths corresponding to the reference viewer with the perfect/reference vision. A curve, a lookup table (LUT), etc., may be determined in the calibration session. The viewer's specific depths may be computed by adjusting runtime computed depths for the reference viewer with the perfect/reference vision. Additionally, optionally, or alternatively, the viewer's specific head geometric characteristics may be measured or inputted into the image processing system for the purpose of performing accurate gaze/eye tracking and accurate placement of virtual object planes onto which images at different time points are to be projected to by one or more auto-tunable lenses of the image processing system.

It should be noted that objects/persons including the virtual object (214) depicted in the left image (252-1) and the right image (252-2) may be magnified by the auto-tunable lenses (228-1 and 228-2). In some embodiments, based at least in part on the single depth (236), the image processing system determines a magnification factor. For example, the magnification factor may be determined as a ratio of the single depth (236) over the image display depth (242). The image processing system can perform aspect ratio adjustment operations based on the magnification factor determined in connection with the single depth (236) of the virtual object plane (216). For example, the image processing system may receive or decode, from an input video signal, an input left image and an input right image that are used to derive the left image (252-1) and the right image (252-2). The image processing system can apply an inverse of the magnification factor to the input left image and the input right image to generate the left image (252-1) and the right image (252-2) so that objects/persons—which may or may not be located at the virtual object plane (216)—depicted in the left image (252-1) and the right image (252-2) as perceived with the presence of the auto-tunable lenses (228-1 and 228-2) match in aspect ratio, sizes, etc., with the same objects/persons depicted in the input left image and the input left image as perceived without the presence of the auto-tunable lenses (228-1 and 228-2).

Depth information in the left image (252-1) and the right image (252-2) as perceived at the image displays without the presence of the auto-tunable lenses (228-1 and 228-2) may be altered into new depth information in projected images as perceived at the virtual object plane (216) with the presence of the auto-tunable lenses (228-1 and 228-2).

In some embodiments, depth information can be derived from a combination of disparity image(s) related to the input left and right images, camera geometric information of a (virtual or real) camera system that acquires/generates/produces the input left and right images, etc. In some embodiments, the depth information can be directly read from depth map(s) that are received with the input left and right images. Some or all of the disparity image(s), the depth map(s), the camera geometric information, etc., can be received with the left and right images in the input video signal.

Additionally, optionally, or alternatively, in some embodiments, the image processing system applies depth correction operations to the input left image and the input right image in generating the left image (252-1) and the right image (252-2) so that new depth information of objects/persons—which may or may not be located at the virtual object plane (216)—depicted in the left image (252-1) and the right image (252-2) as perceived with the presence of the auto-tunable lenses (228-1 and 228-2) match input depth information of the same objects/persons depicted in the input left image and the input left image as perceived without the presence of the auto-tunable lenses (228-1 and 228-2).

Additionally, optionally, or alternatively, in some embodiments, a (e.g., low-strength, etc.) blurring filter with variable spatial resolutions may be applied to image processing operations that generate the left image (252-1) and the right image (252-2) to decimate to varying degrees high spatial frequency content from the left image (252-1) and the right image (252-2) that are located outside the viewer's foveal vision. The blurring filter may be used to simulate blurring functions performed by the viewer's retina. The strength of blurring filtering may increase as the distances of image details as represented at the virtual object plane (e.g., 216-1, etc.) relative to the viewer's foveal vision increase.

In some embodiments, the blurring filter performs no or little blurring in image details that encompass the viewer's foveal vision (e.g., 106-1, 106-2, etc.), and performs increasingly stronger blurring in image details that are increasingly away from the viewer's foveal vision, for example, in areas of retinas (e.g., 110-1, 110-2, etc.) that are outside the viewer's foveal vision (e.g., 106-1, 106-2, etc.).

Figure 2C:
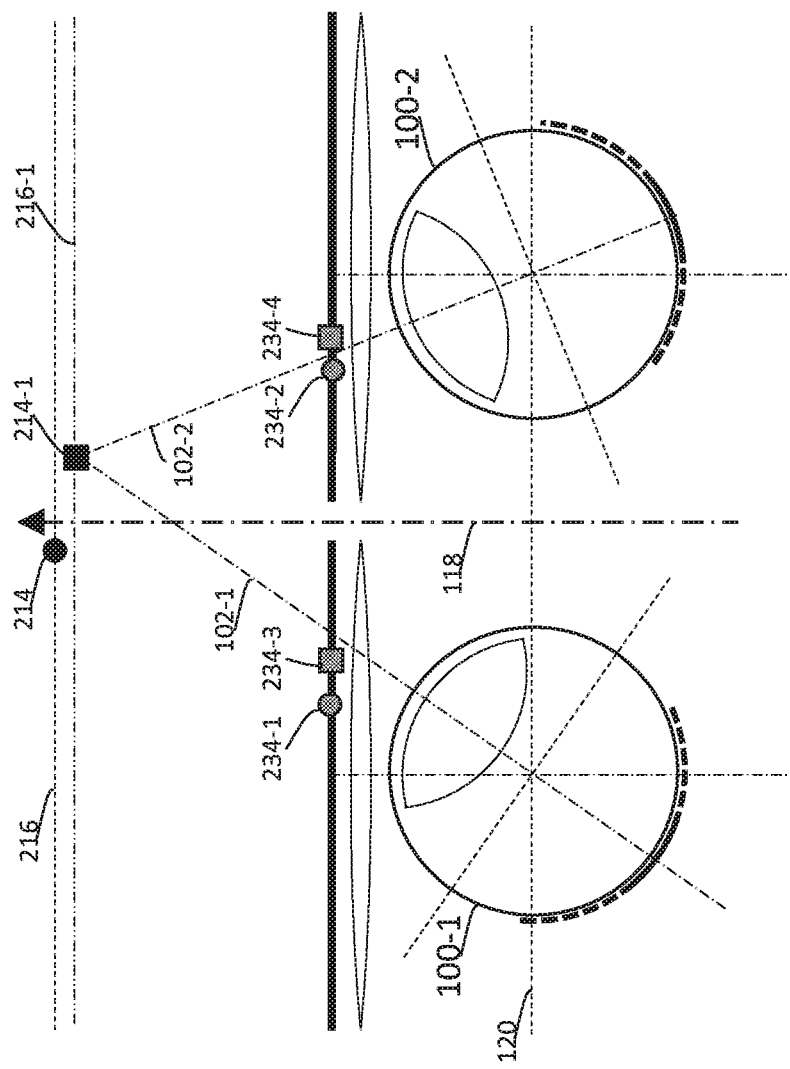
FIG. 2C illustrates example tracking of a viewer's vergence angles in viewing a time sequence of stereoscopic images.
Figure 2D:
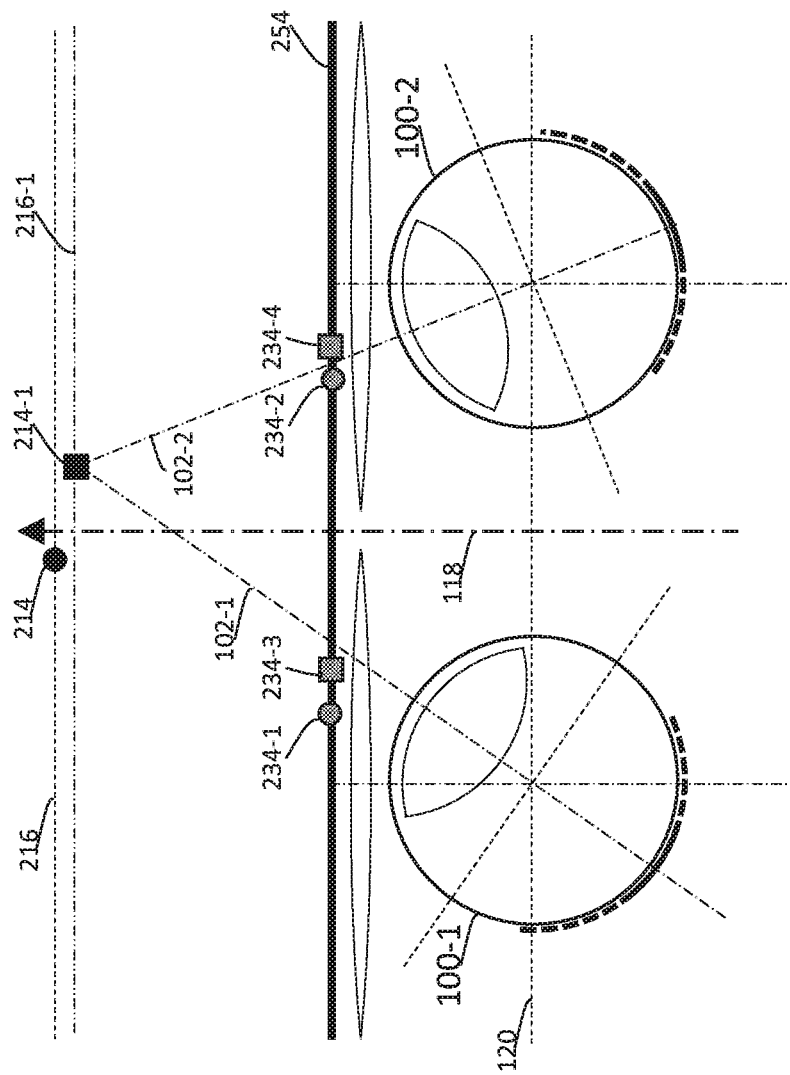
Figure 2E:
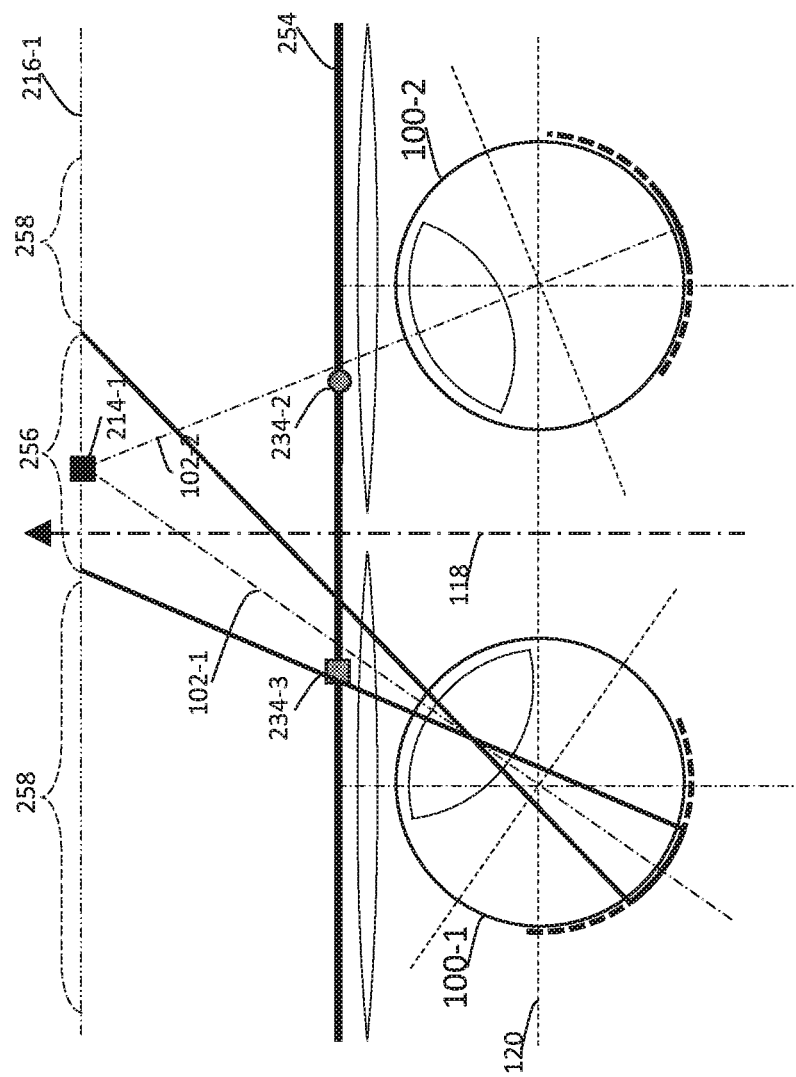
FIG. 2E illustrates an example blurring filter.

For example, as illustrated in FIG. 2E, a first blurring filter can be used to perform no or little blurring in image details in the left image (252-1) that are projected onto a left foveal vision section 256 of the virtual object plane (e.g., 216-1, etc.). The left foveal vision section (256) of the virtual object plane encompasses the viewer's left foveal vision (106-1). The first blurring filter can be used to perform stronger blurring in image details in the left image (252-1) that are projected onto one or more left non-foveal vision sections 258 of the virtual object plane (e.g., 216-1, etc.). The left non-foveal vision sections (258) of the virtual object plane are not in the viewer's left foveal vision (106-1).

Likewise, a second blurring filter can be used to perform no or little blurring in image details in the right image (252-2) that are projected onto a right foveal vision section (not shown) of the virtual object plane (e.g., 216-1, etc.). The right foveal vision section of the virtual object plane encompasses the viewer's right foveal vision (106-2). The second blurring filter can be used to perform stronger blurring in image details in the right image (252-2) that are projected onto one or more right non-foveal vision sections (not shown) of the virtual object plane (e.g., 216-1, etc.). The right non-foveal vision sections of the virtual object plane are not in the viewer's right foveal vision (106-2).

5. Tracking Vergence Angles

FIG. 2C illustrates example tracking of a viewer's vergence angles in viewing a time sequence of stereoscopic images. The time sequence of stereoscopic images may depict one or more scenes, a sub-division of a scene, a group of pictures (GOP), etc. Each of the stereoscopic images may be represented by a combination of two 3D images or a combination of two or more multi-view images. As used herein, vergence angles refer to viewing angles of an individual eye (e.g., the left eye, the right eye, etc.) of the viewer. Example vergence angles to be tracked by techniques as described herein may include, but are not necessarily limited to only, any of: left vergence angles (or vergence angles of the left eye), right vergence angles (or vergence angles of the right eye), vergence angles relative to a reference direction such as one of the viewer's inter-pupillary line (120), the viewer's frontal viewing direction (118), etc.; elevation angles relative to the viewer's level viewing plane or the viewer's (vertical) midline of face; etc.

For the purpose of illustration only, at a first time point, an image processing system as described herein determines or measures that the viewer's eyes are looking at the virtual object (214) located at the virtual object plane (216) at a first stereoscopic image comprising a combination of a first left image and a second right image as projected by one or more auto-tunable lenses of the image processing system to the virtual object plane (216) from the image displays at which images representing the time sequence of stereoscopic images are rendered.

From the first time point to a second time point, the viewer's eyes converge or diverge to a second virtual object 214-1 located at a second virtual object plane 216-1, depicted in the time sequence of stereoscopic images.

The second time point may be a time point that is one of: immediately following the first time point, following the first time point by one or more frame time intervals (each frame time interval corresponding to displaying one image frame), following the first time point by a fraction of frame time interval, etc.

As illustrated in FIG. 2C, at the second time point, the viewer's left eye converges (moving inwardly) to the second virtual object (214-1), whereas the viewer's right eye diverges (moving outwardly) to the second virtual object (214-1). It should be noted that in various scenarios, the viewer's eyes can also both converge, or both diverge.

In some embodiments, the image processing system can measure/track the viewer's vergence angles at the second time point. Based on the viewer's vergence angles at the second time point, the image processing system can determine that the viewer is looking at the second virtual object (214-1) located at the second virtual object plane (216-1).

In response to determining that the viewer is looking at the second virtual object (214-1) located at the second virtual object plane (216-1), the image processing system can project a second stereoscopic image represented by a combination of a second left image and a second right image to the second virtual object plane (216-1). The second stereoscopic image may be a stereoscope image (in the time sequence of stereoscopic images) that is one of: immediately following the first stereoscopic image, following the first stereoscopic image by one or more frame time intervals (each frame time interval corresponding to displaying one image frame), following the first stereoscopic image within a (e.g., strictly) fixed time duration, etc.

FIG. 2D illustrates example viewing of a stereoscopic image comprising the left image (252-1) and the right image (252-2) through one or more auto-tunable lenses 228-1, 228-2, etc., disposed in between (a) one or more image displays on which the left image (252-1) and the right image (252-2) are rendered and (b) the viewer's eyes (100-1 and 100-2). As illustrated, the image displays on which the left image (252-1) and the right image (252-2) may be provided by a single display screen 254. In an example, the single display screen (254) may be a display screen of a mobile phone, a personal digital assistant (PDA), an e-book reader, a TV, etc.

In some embodiments, a left image (e.g., 252-1) and a right image (e.g., 252-2) of a stereoscopic image (e.g., an input stereoscopic image, a modified stereoscopic image derived from an input stereoscopic image, etc.) as described herein can be rendered either concurrently or frame sequentially in one or more image displays that may or may not overlap with one another. Additionally, optionally, or alternatively, multiple image displays as described herein used to render the stereoscopic image may be provided by a single display screen or by multiple display screens.

In some embodiments, two image displays are used to render the left image and the right image of the stereoscopic image, and are provided by two distinct display screens (e.g., two display screens in a near-eye display device, etc.) respectively. In these embodiments, the left image and the right image may be concurrently displayed to the viewer. Additionally, optionally, or alternatively, the left image and the right image may be frame sequentially displayed to the viewer with one of the left image and the right image displayed first and followed by the other of the left image and the right image displayed.

In some embodiments, two image displays are used to render the left image and the right image of the stereoscopic image, and are provided by two spatial sections on a single display screen (e.g., two spatial sections on an iPhone screen, etc.) respectively. In some embodiments, these two spatial sections may not be overlapped. In some embodiments, these two spatial sections may be at least partly overlapped. In all these embodiments, the left image and the right image may be concurrently displayed to the viewer. Additionally, optionally, or alternatively, the left image and the right image may be frame sequentially displayed to the viewer with one of the left image and the right image displayed first and followed by the other of the left image and the right image displayed.

In some embodiments, one image display is used to render the left image and the right image of the stereoscopic image, and is provided by a single display screen (e.g., a TV, etc.). The left image and the right image may be concurrently displayed to the viewer. The concurrently displayed images may be distinguished by using different light wavelengths, different lenticular views, different light polarizations, etc. Additionally, optionally, or alternatively, the left image and the right image may be frame sequentially displayed to the viewer with one of the left image and the right image displayed first and followed by the other of the left image and the right image displayed.

In various embodiments, different views (e.g., the left and right images, etc.) of a stereoscopic image (or multi-view image) as described herein may be distinguished in an image processing system from one another by one or more of: different display screens, different spatial sections of a single display screen, different frames at different time points, different (e.g., non-overlapping) light wavelengths assigned to different views, different lenticular views assigned to different views, different light polarizations to different views, etc.

6. Example Video Streaming Servers and Clients

Figure 3A:
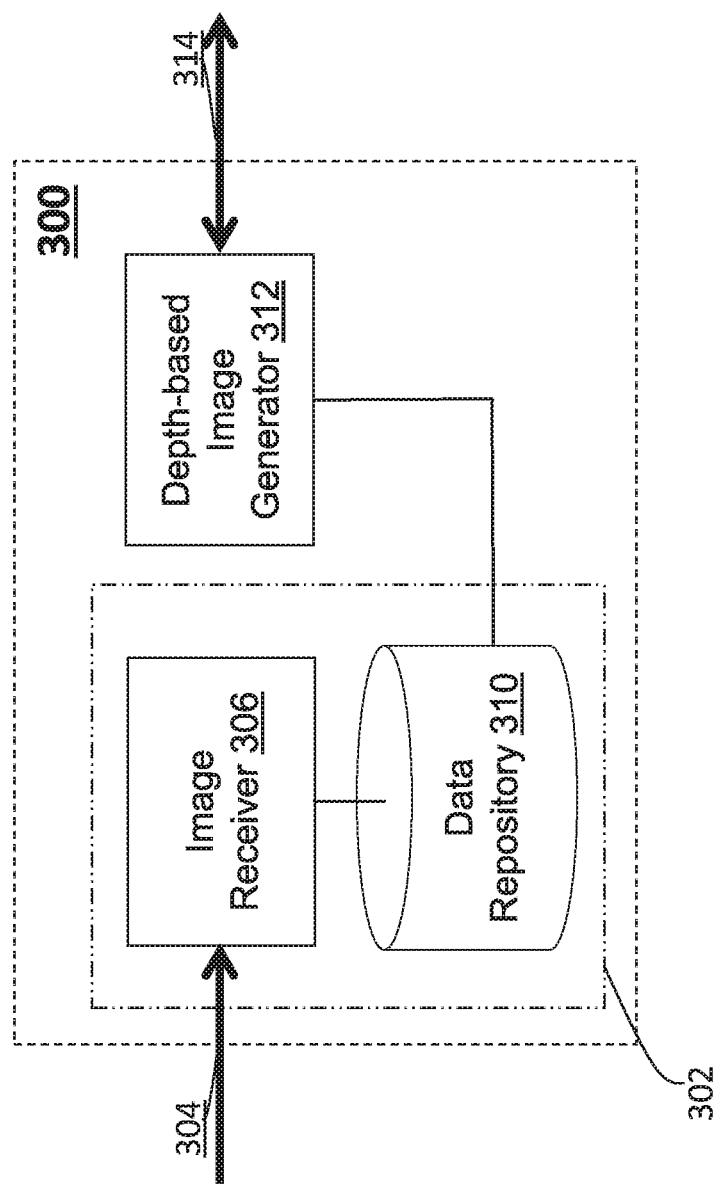
FIG. 3A and FIG. 3B illustrate example video streaming servers and clients.

FIG. 3A illustrates an example video streaming server 300 that comprises an image processor 302, a depth-based image generator 312, etc. In some embodiments, the image processor (302) comprises an image receiver 306, a data repository 310, etc. Some or all of the components of the video streaming server (300) may be implemented by one or more devices, modules, units, etc., in software, hardware, a combination of software and hardware, etc.

In some embodiments, the image receiver (306) comprises software, hardware, a combination of software and hardware, etc., configured to receive an input image stream 304 from an image source such as a cloud-based image source, a camera system in connection with a VR application, an AR application, a remote presence application, a 3D display application, a multi-view display application, etc.; decode the input image stream (304) into one or more input stereoscopic images (e.g., a sequence of input stereoscopic images, a sequence of input multi-view images, etc.); etc. In some embodiments, the input image stream (304) may carry image metadata (e.g., camera geometric information, etc.) that can be decoded by the image receiver (306) from the input image stream (304).

In some embodiments, the data repository (310) represents one or more databases, one or more data storage units/modules/devices, etc., configured to support operations such as storing, updating, retrieving, deleting, etc., with respect to some or all of the input stereoscopic images, the image metadata, etc. In some embodiments, the input stereoscopic images are retrieved from the data repository (310) by the depth-based image generator (308) instead of the input image stream (304).

In some embodiments, the depth-based image generator (308) comprises software, hardware, a combination of software and hardware, etc., configured to receive, via a bidirectional data flow 314, vergence angles, etc., of a user (or a viewer) over time; generate an output video stream comprising depth-based stereoscopic images and depth control metadata; provide/transmit the output video stream via the bidirectional data flow 314 directly or indirectly through intermediate devices, etc.) to a stereoscopic video streaming client, a display device, a storage device, etc. In various embodiments, the depth-based stereoscopic images may refer to input stereoscopic images (e.g., received by the video streaming server (300), etc.) or modified stereoscopic images derived from input stereoscopic images.

The depth control metadata may represent a function of single depths over time. A single depth at any given time point as indicated in the depth control metadata may be determined computed based at least in part on the vergence angles of the user and other geometric information (e.g., distances between image displays and the user's eyes, distances between image displays and auto-tunable lenses, etc.) related to image displays, etc., and may be used to control one or more focal lengths of one or more auto-tunable lenses in an image rendering device that is being used by the user to view the stereoscopic images to project a corresponding stereoscopic image for which the single depth is determined/computed.

Additionally, optionally, or alternatively, some or all of image processing operations such as aspect ratio adjustment operations, depth correction operations, blurring filtering, scene cut detections, transformations between coordinate systems, temporal dampening, display management, content mapping, color mapping, field-of-view management, etc., may be performed by the stereoscopic video streaming server (300) for the purpose of generating the depth-based stereoscopic images and the depth control metadata encoded into the output video stream.

The video streaming server (300) may be used to support real time vision applications, near-real-time vision applications, non-real-time vision applications, virtual reality, augmented reality, helmet mounted display applications, heads up display applications, games, 2D display applications, 3D display applications, multi-view display applications, etc.

Figure 3B:
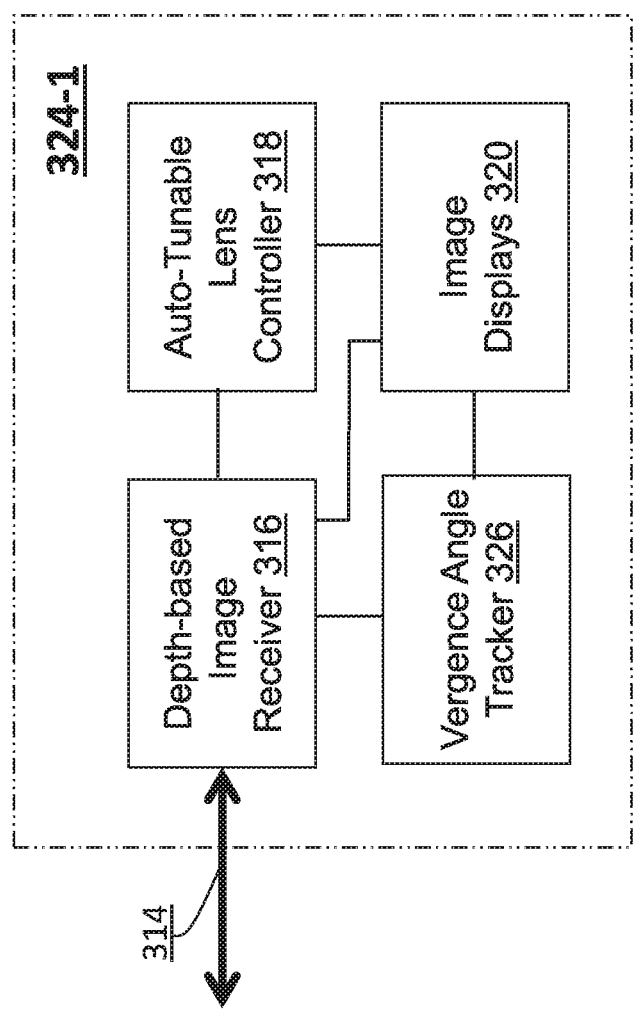

FIG. 3B illustrates an example image rendering system 324-1 that comprises a depth-based image receiver 316, a vergence angle tracker 326, an auto-tunable lens controller 318, one or more image displays 320, etc. Some or all of the components of the image rendering system (324-1) may be implemented by one or more devices, modules, units, etc., in software, hardware, a combination of software and hardware, etc.

A user (or viewer) may move the user's vergence angles to image details (or visual objects/persons depicted in the stereoscopic images) of different depths respectively at different time points at runtime. In some embodiments, the vergence angle tracker (326) comprises software, hardware, a combination of software and hardware, etc., configured to track vergence angles, etc., of the user over time. The user's vergence angles over time may be sampled or measured at a relatively fine time scales (e.g., every millisecond, every five milliseconds, etc.).

In some embodiments, the depth-based image receiver (316) comprises software, hardware, a combination of software and hardware, etc., configured to send, via a bidirectional data flow 314, the user's vergence angles, other geometric information (e.g., distances between image displays and the user's eyes, distances between image displays and auto-tunable lenses, etc.), etc.; receive a video stream (e.g., outputted by an upstream device, etc.) comprising depth-based stereoscopic images and depth control metadata corresponding to the depth-based stereoscopic images; etc.

The image rendering system (324-1) is configured to decode the received video stream into the depth-based stereoscopic images and the depth control metadata; render the depth-based stereoscopic images (e.g., each of which comprising left and right images), as decoded from the received video stream, on the image displays (320).

In some embodiments, the auto-tunable lens controller (318) comprises software, hardware, a combination of software and hardware, etc., configured to use the depth control metadata to control one or more auto-tunable lenses to project the stereoscopic images, as rendered on the image displays (320), to virtual images at the different depths respectively at the different time points (e.g., subject to a real time processing delay of a millisecond, 10 millisecond, a fraction of a frame time, etc.).

Additionally, optionally, or alternatively, some or all of image rendering operations such as gaze/eye tracking, aspect ratio adjustment operations, depth correction operations, blurring filtering, scene cut detections, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time, near real time, or non-real time vision applications, near-real-time vision applications, non-real-time vision applications, virtual reality, augmented reality, helmet mounted display applications, heads up display applications, games, 2D display applications, 3D display applications, multi-view display applications, etc.

Techniques as described herein can be implemented in a variety of system architectures. Some or all image processing operations as described herein can be implemented by any combination of one or more of cloud-based video streaming servers, video streaming servers collocated with or incorporated into video streaming clients, image rendering systems, image rendering systems, display devices, etc. Based on one or more factors such as types of vision applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
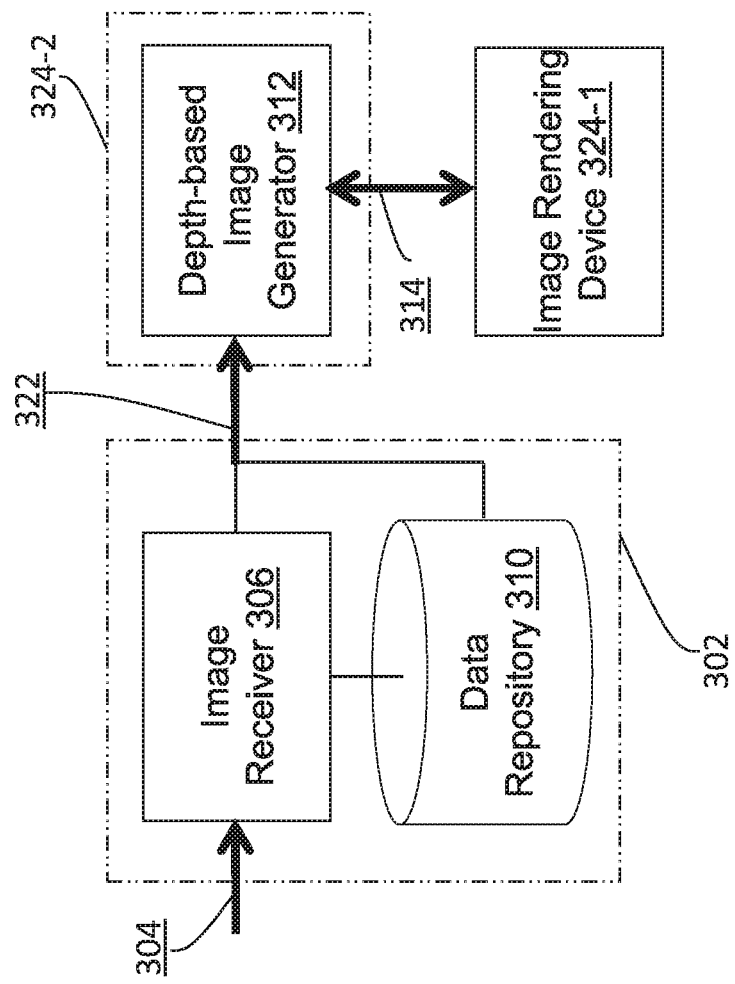
FIG. 3C illustrates an example configuration in which a depth-based image generator is incorporated into an edge video streaming server.

FIG. 3C illustrates an example configuration in which a depth-based image generator (e.g., 312, etc.) is incorporated into an edge video streaming server 324-2. In some embodiments, an image processor 302 of FIG. 3C may be cloud-based. In some embodiments, the image processor (302) may be located in a core network separate from edge devices such as the edge video streaming server (324-2). As in FIG. 3A, the image processor (302) may comprise an image receiver 306, a data repository 310, etc. The image processor (302) may represent an upstream video streaming server that communicates with the edge video streaming server (324-2) over relatively high bitrates. Some or all of the components of the image processor (302) and/or the edge video streaming server (324-2) may be implemented by one or more devices, modules, units, etc., in software, hardware, a combination of software and hardware, etc.

In some embodiments, the image processor (302) is configured to send input stereoscopic images in a data flow 322 to downstream devices one of which may be the edge video streaming server (324-2).

In some embodiments, the edge video streaming server (324-2), or the depth-based image generator (312) therein, comprises software, hardware, a combination of software and hardware, etc., configured to determine vergence angles, other geometric information, etc., of a user over time; generate an output video stream comprising depth-based stereoscopic images and depth control metadata; provide/transmit the output video stream via the bidirectional data flow 314 directly or indirectly through intermediate devices, etc.) to a video streaming client, a display device, a storage device, etc.

7. Example Process Flows

FIG. 4 illustrates an example process flow according to an example embodiment of the present invention. In some example embodiments, one or more computing devices or components may perform this process flow. In block 402, an image processing system (e.g., any combination of a video streaming server or a video streaming client of FIG. 3A through FIG. 3C, etc.) determines, while a viewer is viewing a first stereoscopic image comprising a first left image and a first right image, a left vergence angle of a left eye of a viewer and a right vergence angle of a right eye of the viewer.

In block 404, the image processing system determines, based at least in part on (i) the left vergence angle of the left eye of the viewer and (ii) the right vergence angle of the right eye of the viewer, a virtual object depth.

In block 406, the image processing system renders a second stereoscopic image comprising a second left image and a second right image for the viewer on one or more image displays. The second stereoscopic image is subsequent to the first stereoscopic image.

In block 408, the image processing system projects the second stereoscopic image from the one or more image displays to a virtual object plane at the virtual object depth.

In an embodiment, the second left image and the second right image are generated from an input left image and an input right image by applying one or more aspect ratio adjustment operations that adjust aspect ratios of visual objects depicted in the input left image and the input right image to modified aspect ratios of the visual objects depicted in the second left image and the second right image as projected to the virtual object plane at the virtual object depth.

In an embodiment, the second left image and the second right image are generated from an input left image and an input right image by applying one or more depth correction operations that converts depths of visual objects depicted in the input left image and the input right image to modified depths of the visual objects depicted in the second left image and the second right image as projected to the virtual object plane at the virtual object depth.

In an embodiment, the second left image and the second right image are generated from an input left image and an input right image by applying one or more blurring filtering operations that blur the one or more spatial regions of the second left image and the second right image relative to the input left image and the input right image; the one or more spatial regions of the second left image and the second right image are away from the viewer's foveal vision.

In an embodiment, the second left image and the second right image of the second stereoscopic image are rendered concurrently to be viewed by the viewer.

In an embodiment, the second left image and the second right image of the second stereoscopic image are rendered frame sequentially to be viewed by the viewer.

In an embodiment, the second stereoscopic image is immediately subsequent to the first stereoscopic image in time in a sequence of stereoscopic images that are rendered to be viewed by the viewer.

In an embodiment, one or more auto-tunable lenses are used to project the second stereoscopic image to the virtual object plane at the virtual object depth; one or more focal lengths of the one or more auto-tunable lenses are determined based at least in part on the virtual object depth.

In an embodiment, the second stereoscopic image is generated from a second input stereoscopic image in a sequence of input stereoscopic images; no other stereoscopic image other than the second stereoscopic image is generated from the second input stereoscopic image; no other virtual object depth other than the virtual object depth is the second stereoscopic image projected.

In an embodiment, the second left image and the second right image of the second stereoscopic image are rendered on a first image display and a second image display respectively.

In an embodiment, the second left image and the second right image of the second stereoscopic image are rendered on a single image display.

In an embodiment, at least one of the second left image and the second right image of the second stereoscopic image is projected to the virtual object plane based on an auto-tunable lens comprising a single lens element.

In an embodiment, at least one of the second left image and the second right image of the second stereoscopic image is projected to the virtual object plane based on an auto-tunable lens comprising multiple lens elements.

In an embodiment, the second left image of the second stereoscopic image is viewable only by the left eye of the viewer, whereas the second right image of the second stereoscopic image is viewable only by the right eye of the viewer.

In an embodiment, the image processing system is further configured to perform: while the viewer is viewing the second stereoscopic image comprising the second left image and the second right image, determining a second left vergence angle of the left eye of the viewer and a second right vergence angle of the right eye of the viewer; determining, based at least in part on (i) the second left vergence angle of the left eye of the viewer and (ii) the second right vergence angle of the right eye of the viewer, a second virtual object depth; rendering a third stereoscopic image comprising a third left image and a third right image for the viewer on the one or more image displays, the third stereoscopic image being subsequent to the second stereoscopic image; projecting the third stereoscopic image from the on one or more image displays to a second virtual object plane at the second virtual object depth; etc.

In an embodiment, the virtual object depth is adjusted based at least in part on specific vision characteristics of the viewer.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
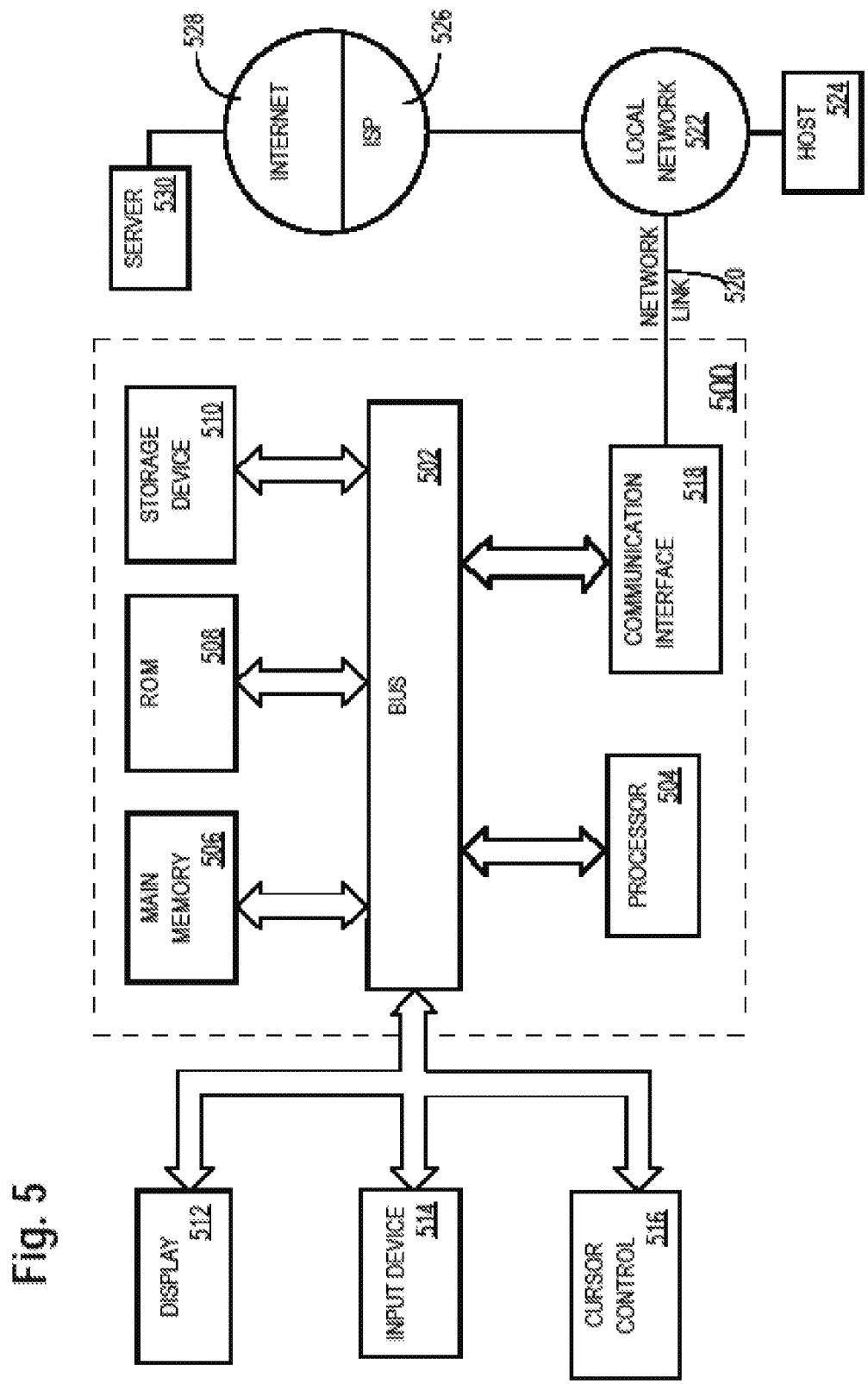
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:
  while a viewer is viewing a first stereoscopic image comprising a first left image and a first right image, determining a left vergence angle of a left eye of a viewer and a right vergence angle of a right eye of the viewer;
  determining, based at least in part on (i) the left vergence angle of the left eye of the viewer and (ii) the right vergence angle of the right eye of the viewer, a virtual object depth;
  rendering a second stereoscopic image comprising a second left image and a second right image for the viewer on one or more image displays, wherein the second stereoscopic image is subsequent to the first stereoscopic image;

projecting the second stereoscopic image from the one or more image displays to a virtual object plane at the virtual object depth.

EEE 2. The method of EEE 1, wherein the second left image and the second right image are generated from an input left image and an input right image by applying one or more aspect ratio adjustment operations that adjust aspect ratios of visual objects depicted in the input left image and the input right image to modified aspect ratios of the visual objects depicted in the second left image and the second right image as projected to the virtual object plane at the virtual object depth.

EEE 3. The method of EEE 1, wherein the second left image and the second right image are generated from an input left image and an input right image by applying one or more depth correction operations that converts depths of visual objects depicted in the input left image and the input right image to modified depths of the visual objects depicted in the second left image and the second right image as projected to the virtual object plane at the virtual object depth.

EEE 4. The method of EEE 1, wherein the second left image and the second right image are generated from an input left image and an input right image by applying one or more blurring filtering operations that blur the one or more spatial regions of the second left image and the second right image relative to the input left image and the input right image, and wherein the one or more spatial regions of the second left image and the second right image are away from the viewer's foveal vision.

EEE 5. The method of EEE 1, wherein the second left image and the second right image of the second stereoscopic image are rendered concurrently to be viewed by the viewer.

EEE 6. The method of EEE 1, wherein the second left image and the second right image of the second stereoscopic image are rendered frame sequentially to be viewed by the viewer.

EEE 7. The method of EEE 1, wherein the second stereoscopic image is immediately subsequent to the first stereoscopic image in time in a sequence of stereoscopic images that are rendered to be viewed by the viewer.

EEE 8. The method of EEE 1, wherein one or more auto-tunable lenses are used to project the second stereoscopic image to the virtual object plane at the virtual object depth, and wherein one or more focal lengths of the one or more auto-tunable lenses are determined based at least in part on the virtual object depth.

EEE 9. The method of EEE 1, wherein the second stereoscopic image is generated from a second input stereoscopic image in a sequence of input stereoscopic images, wherein no other stereoscopic image other than the second stereoscopic image is generated from the second input stereoscopic image, and wherein no other virtual object depth other than the virtual object depth is the second stereoscopic image projected.

EEE 10. The method of EEE 1, wherein the second left image and the second right image of the second stereoscopic image are rendered on a first image display and a second image display respectively.

EEE 11. The method of EEE 1, wherein the second left image and the second right image of the second stereoscopic image are rendered on a single image display.

EEE 12. The method of EEE 1, wherein at least one of the second left image and the second right image of the second stereoscopic image is projected to the virtual object plane based on an auto-tunable lens comprising a single lens element.

EEE 13. The method of EEE 1, wherein at least one of the second left image and the second right image of the second stereoscopic image is projected to the virtual object plane based on an auto-tunable lens comprising multiple lens elements.

EEE 14. The method of EEE 1, wherein the second left image of the second stereoscopic image is visually perceivable only by the left eye of the viewer, whereas the second right image of the second stereoscopic image is visually perceivable only by the right eye of the viewer.

EEE 15. The method of EEE 1, further comprising:
while the viewer is viewing the second stereoscopic image comprising the second left image and the second right image, determining a second left vergence angle of the left eye of the viewer and a second right vergence angle of the right eye of the viewer;
determining, based at least in part on (i) the second left vergence angle of the left eye of the viewer and (ii) the second right vergence angle of the right eye of the viewer, a second virtual object depth;
rendering a third stereoscopic image comprising a third left image and a third right image for the viewer on the one or more image displays, wherein the third stereoscopic image is subsequent to the second stereoscopic image;
projecting the third stereoscopic image from the on one or more image displays to a second virtual object plane at the second virtual object depth.

EEE 16. The method of EEE 1, wherein the virtual object depth is adjusted based at least in part on specific vision characteristics of the viewer.

EEE 17. An apparatus performing any of the methods as recited in EEEs 1-16.

EEE 18. A system performing any of the methods as recited in EEEs 1-16.

EEE 19. A non-transitory computer readable storage medium, storing software instructions, which when executed by one or more processors cause performance of the method recited in any of EEEs 1-16.

EEE 20. A computing device comprising one or more processors and one or more storage media, storing a set of instructions, which when executed by one or more processors cause performance of the method recited in any of EEEs 1-16.

What is claimed is:

1. A method comprising:
while a viewer is viewing a first stereoscopic image comprising a first left image and a first right image, determining a left vergence angle of a left eye of a viewer and a right vergence angle of a right eye of the viewer;
determining, based at least in part on (i) the left vergence angle of the left eye of the viewer and (ii) the right vergence angle of the right eye of the viewer, a virtual object depth;
rendering a second stereoscopic image comprising a second left image and a second right image for the viewer on one or more image displays, wherein the second stereoscopic image is subsequent to the first stereoscopic image;
projecting the second stereoscopic image from the one or more image displays to a virtual object plane at the virtual object depth, wherein the second left image and the second right image are generated from an input left image and an input right image by applying one or more blurring filtering operations that blur one or more spatial regions of the second left image and the second right image relative to the input left image and the input right image, and wherein the one or more spatial regions of the second left image and the second right image are away from the viewer's foveal vision;
wherein the blurring filter operations are implemented by a blurring filter having a variable spatial resolution;
wherein the blurring filter includes a first and a second blurring filter, the first blurring filter configured to cause no or minimal blurring in image details in the second left image that are projected onto a left foveal vision section of the virtual object plane, and the second blurring filter configured to cause no or minimal blurring in image details in the second right image that are projected onto a right foveal vision section of the virtual object plane.

2. The method according to claim 1, wherein the blurring filter operations include a strength of blurring, the strength of blurring increasing as the distance of an image detail in the second left and right images represented at the virtual object plane increases relative to the viewer's foveal vision.

3. The method according to claim 2, wherein the blurring filter operations include:
minimal or no blurring in image details that encompass the viewer's foveal vision, and
increasingly stronger blurring in image details that are increasingly away from the viewer's foveal vision.

4. The method according to claim 1, wherein the first and second blurring filters are configured to cause stronger blurring in image details in the left respectively right second images that are projected onto one or more left respectively right non-foveal vision sections of the virtual object plane.

5. The method according to claim 1, wherein the second left image and the second right image are generated from an input left image and an input right image by applying one or more aspect ratio adjustment operations that adjust aspect ratios of visual objects depicted in the input left image and the input right image to modified aspect ratios of the visual objects depicted in the second left image and the second right image as projected to the virtual object plane at the virtual object depth.

6. The method according to claim 1, wherein the second left image and the second right image are generated from an input left image and an input right image by applying one or more depth correction operations that converts depths of visual objects depicted in the input left image and the input right image to modified depths of the visual objects depicted in the second left image and the second right image as projected to the virtual object plane at the virtual object depth.

7. The method according to claim 1, wherein the second left image and the second right image of the second stereoscopic image are rendered concurrently to be viewed by the viewer.

8. The method according to claim 1, wherein the second left image and the second right image of the second stereoscopic image are rendered frame sequentially to be viewed by the viewer.

9. The method according to claim 1, wherein the second stereoscopic image is immediately subsequent to the first stereoscopic image in time in a sequence of stereoscopic images that are rendered to be viewed by the viewer.

10. The method according to claim 1, wherein one or more auto-tunable lenses are used to project the second stereoscopic image to the virtual object plane at the virtual object depth, and wherein one or more focal lengths of the one or more auto-tunable lenses are determined based at least in part on the virtual object depth.

11. The method according to claim 1, wherein the second stereoscopic image is generated from a second input stereoscopic image in a sequence of input stereoscopic images, wherein no other stereoscopic image other than the second stereoscopic image is generated from the second input stereoscopic image, and wherein no other virtual object depth other than the virtual object depth is the second stereoscopic image projected.

12. The method according to claim 1, wherein the second left image and the second right image of the second stereoscopic image are rendered on a first image display and a second image display respectively.

13. The method according to claim 1, wherein the second left image and the second right image of the second stereoscopic image are rendered on a single image display.

14. The method according to claim 1, wherein at least one of the second left image and the second right image of the second stereoscopic image is projected to the virtual object plane based on an auto-tunable lens comprising a single lens element.

15. The method according to claim 1, wherein at least one of the second left image and the second right image of the second stereoscopic image is projected to the virtual object plane based on an auto-tunable lens comprising multiple lens elements.

16. The method according to claim 1, wherein the second left image of the second stereoscopic image is visually perceivable only by the left eye of the viewer, whereas the second right image of the second stereoscopic image is visually perceivable only by the right eye of the viewer.

17. The method according to claim 1, further comprising:
while the viewer is viewing the second stereoscopic image comprising the second left image and the second right image, determining a second left vergence angle of the left eye of the viewer and a second right vergence angle of the right eye of the viewer;
determining, based at least in part on (i) the second left vergence angle of the left eye of the viewer and (ii) the second right vergence angle of the right eye of the viewer, a second virtual object depth;
rendering a third stereoscopic image comprising a third left image and a third right image for the viewer on the one or more image displays, wherein the third stereoscopic image is subsequent to the second stereoscopic image;
projecting the third stereoscopic image from the on one or more image displays to a second virtual object plane at the second virtual object depth.

18. The method according to claim 1, wherein the virtual object depth is adjusted based at least in part on at least one characteristic of the viewer, the characteristic selected from the group consisting of {near-sightedness, far-sightedness, normal stereoscopic vision, abnormal stereoscopic vision, wearing glasses, wearing no glasses, wearing contact lenses, inter-pupillary distance, and eye-to-auto-tunable-lens distance}.

19. An apparatus configured to perform the method as recited in claim 1.

20. A non-transitory computer readable storage medium, storing software instructions, which when executed by one or more processors cause performance of the method recited in claim 1.

21. A computing device comprising one or more processors and one or more storage media, storing a set of instructions, which when executed by one or more processors cause performance of the method recited in claim 1.

\* \* \* \* \*